(12) United States Patent
Pachlore et al.

(10) Patent No.: US 12,361,373 B2
(45) Date of Patent: Jul. 15, 2025

(54) CONNECTED CONTAINER

(71) Applicant: UST Global (Malaysia) Sdn. Bhd., Johor Bahru (MY)

(72) Inventors: Mohanish ChandrapalSingh Pachlore, Penang (MY); Krishna Prakash Radhakrishna Nair, Penang (MY)

(73) Assignee: UST Global (Malaysia) Sdn. Bhd., Johor Bahru (MY)

( * ) Notice: Subject to any disclaimer, the term of this patent is extended or adjusted under 35 U.S.C. 154(b) by 94 days.

(21) Appl. No.: 17/523,682

(22) Filed: Nov. 10, 2021

(65) Prior Publication Data
US 2022/0245570 A1      Aug. 4, 2022

(30) Foreign Application Priority Data
Nov. 5, 2020   (MY) ............................ PI2020005784

(51) Int. Cl.
*G06Q 10/087*   (2023.01)
*B65D 25/20*    (2006.01)

(52) U.S. Cl.
CPC ......... *G06Q 10/087* (2013.01); *B65D 25/205* (2013.01); *B65D 2203/10* (2013.01)

(58) Field of Classification Search
CPC ...... G06Q 10/087; G06Q 10/00; G06Q 20/00; G06Q 30/00; G06Q 40/00; G06Q 90/00; G06Q 20/3278; G06Q 20/3274; G06Q 50/10; G06Q 10/06; G06Q 30/02; G06Q 30/06; G06Q 30/0601; B65D 25/205; B65D 2203/10; G01F 9/003; G01G 11/02; G01G 11/04; G01G 11/06; G01G 19/24; G01G 19/4146; G01G 23/3728; G01G 23/3735; G01G 19/56; G08B 13/1472; H05B 6/6464; H05B 6/6435; H05B 6/6441; H05B 1/0266; H05B 6/062; H05B 6/12; H05B 6/1209; H05B 6/688; H01L 27/1112; H01L 224/7592; H01L 2224/7692; H01L 2224/7792; H01L 2224/7892; H01L 2224/7992; G03G 21/1657; G06F 19/323; G06F 2212/178; G06F 16/685;
(Continued)

(56) References Cited

U.S. PATENT DOCUMENTS 11,126,955 B1 *  9/2021  Watson ............. G06Q 30/0633
11,681,984 B2 *  6/2023  Kimmel ............ G06Q 10/0875
                                                          705/29
(Continued)

FOREIGN PATENT DOCUMENTS

WO   WO-2007033294 A2 *  3/2007  ............. G06Q 10/06

*Primary Examiner* — Avia Salman
(74) *Attorney, Agent, or Firm* — Nixon Peabody LLP

(57) ABSTRACT

A system is disclosed for dynamically measuring the contents of storage containers over time. One or more sensor tags can be coupled to a container, incorporated or placed within a container, or associated with a receiving space for the container to measure a weight of the contents of the container. Each sensor tag can communicate with one another, a hub unit, and/or a local area network (e.g., a WiFi network) to provide information about the container to which the sensor tag is associated. The system is able to determine when a particular type of contents is running low and/or expected to be depleted, thus permitting the system to facilitate ordering replacement material to refill or replace the container.

20 Claims, 7 Drawing Sheets

(58) Field of Classification Search
CPC .... G06F 40/205; G06F 40/216; G06F 40/284; G06F 11/3438; G06F 13/00; G06F 16/2246; G06F 16/23; G06F 16/245; G06F 16/40; G06F 16/435; G06F 16/9535; G06F 3/0482; G06F 3/14; G06F 3/1415; G06F 40/20; G06F 9/451; G07G 1/0045; G07G 1/009; G09F 3/0335; G16H 10/65; H01H 2300/032; H04M 2250/04; H04Q 1/138; H04Q 2209/47; H04W 4/008; H04W 4/80; H04W 4/029; G06V 20/52; G06V 20/68; G09G 2354/00; H01R 39/41; A23L 5/10; A23P 30/20; G05B 15/02; G06N 20/00; G06N 5/02
USPC .......................................................... 705/28
See application file for complete search history.

(56) References Cited

U.S. PATENT DOCUMENTS

| | | | |
|---|---|---|---|
| 2016/0210547 A1* | 7/2016 | Dekeyser | G06K 7/065 |
| 2019/0162585 A1* | 5/2019 | Wallace | G06F 3/048 |
| 2019/0213752 A1* | 7/2019 | Adato | G06Q 10/06316 |
| 2019/0244340 A1* | 8/2019 | Perron | G06V 20/52 |
| 2020/0172387 A1* | 6/2020 | Hershberger | B67D 1/0871 |
| 2020/0182678 A1* | 6/2020 | Flockenhaus | G01F 23/20 |

* cited by examiner

CONNECTED CONTAINER

PRIORITY CLAIM

This application claims priority to Malaysia Application No. PI2020005784, filed Nov. 5, 2020, which is hereby incorporated by reference herein in its entirety.

TECHNICAL FIELD

The present disclosure relates to consumer storage containers generally and more specifically to improvements in monitoring and leveraging the rate of consumption of materials being stored within storage containers.

BACKGROUND

Storage containers can be used to store various contents, such as consumable materials. In a common example, storage containers in a kitchen may be used to store ingredients and other supplies, which may be used daily, weekly, or occasionally. As the materials stored in the storage container get used, it can be desirable to procure more materials to refill or replace the storage container. It can be undesirable to allow a storage container to be emptied completely, as the contents therein may be unavailable when a demand exists. Therefore, there is a need to track the consumption of consumable materials in a container.

Existing techniques to track consumable materials in a container generally rely on mains-powered electronic devices or large scales onto which a container must be placed. There is a need for an unobtrusive, low-power technique for monitoring the consumption of consumable materials in containers.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure relate to a method, comprising: providing a sensor tag associated with a container containing contents, wherein the sensor tag is associated with a sensor tag identifier (ID); determining a contents ID associated with the contents of the container; associating the contents ID with the sensor tag ID; receiving a reporting signal from the sensor tag, wherein the reporting signal comprises the sensor tag ID and a measured weight; associating the measured weight with a contents ID based on the sensor tag ID; and presenting a notification based on the measured weight and the contents ID.

In some cases, the notification is presented when the measured weight drops below a threshold weight, and wherein the notification, when presented, facilitates refilling or replacing the container with new contents of a same type as the contents. In some cases, the method further comprises determining a threshold weight based on the contents ID. In some cases, determining the threshold weight comprises analyzing historical measured weights over time to determine the threshold weight. In some cases, determining the threshold weight comprises: analyzing historical measured weights over time to determine an average weight of contents consumed per unit of time; determining a refill lag time; and calculating the threshold weight based on the average weight of contents consumed per unit of time and the refill lag time. In some cases, the contents ID is associated with a type of the contents. In some cases, determining the contents ID comprises: capturing an image associated with the contents; analyzing the image to determine a type of contents; and determining the contents ID based on the type of contents In some cases, the method further comprises determining an amount of contents remaining based on the measured weight, wherein the amount of contents is an indication of a number of servings or a volume of contents, and wherein presenting the notification based on the measured weight comprises presenting the amount of contents remaining. In some cases, the measured weight is a combined weight of the container and the contents, the method further comprising calculating a weight of the contents by subtracting a tare weight of the container from the combined weight. In some cases, the method further comprises associating a container ID with the sensor tag ID, wherein calculating the weight of the contents comprises accessing the tare weight of the container using the container ID associated with the sensor tag ID. In some cases, the measured weight is a weight of the contents, and wherein the container is positioned within the container to measure the weight of the contents without measuring a weight of the container.

In some cases, providing the sensor tag associated with the container comprises affixing the sensor tag to the container. In some cases, the method further comprises removing the sensor tag from the container; affixing a new sensor tag to the container, the new sensor tag having a new sensor tag ID; and associating the contents ID with the new sensor tag ID. In some cases, providing the sensor tag associated with the container comprises providing a housing having a receiving space associated with the sensor tag and placing the container in the receiving space. In some cases, the method further comprises analyzing an image of the container to determine a specification of the container, wherein presenting the notification is further based on the specification of the container.

In some cases, receiving the reporting signal from the sensor tag is in response to measurement trigger being received by the sensor tag. In some cases, the measurement trigger is received by the sensor tag in response to movement of the container. In some cases, the method further comprises analyzing historical measured weights associated with the contents ID to determine a measurement schedule; and transmitting the measurement schedule to the sensor tag, wherein the measurement schedule, when received by the sensor tag, causes the sensor tag to receive the measurement trigger according to the measurement schedule. In some cases, the measurement schedule is determined to cause the sensor tag to receive the measurement trigger at times when a change in weight of the contents is expected.

In some cases, the method further comprises automatically initiating an order for additional product of the same type as the contents. In some cases, the method further comprises adjusting a function of an appliance in response to the measured weight.

Embodiments of the present disclosure relate to a system comprising: one or more processors; and a memory having stored thereon machine readable instructions; wherein the one or more processors are coupled to the memory, and the method disclosed above is implemented when the machine executable instructions in the memory are executed by at least one of the one or more processors. Embodiments of the present disclosure relate to a system for measuring the contents of containers, the system including one or more processors configured to implement the method disclosed above.

Embodiments of the present disclosure relate to a computer program product comprising instructions which, when executed by a computer, cause the computer to carry out the method disclosed above. In some cases, the computer program product is a non-transitory computer readable medium.

Embodiments of the present disclosure relate to a device for receiving compression force between contents of a container and a surface supporting the container, the device comprising: a housing; a processor coupled to memory and a power source; a weight sensor coupled to the processor for measuring the compression force to determine a measured weight associated with the contents of the container; a communication interface coupled to the processor for transmitting a reporting signal containing the measured weight and a sensor tag identifier (ID); and an adhesive layer coupled to the housing for affixing the housing to the container.

In some cases, the processor is configured to measure the measured weight and transmit the reporting signal in response to a measurement trigger. In some cases, the device further comprises an additional sensor coupled to the processor, wherein the additional sensor is actuatable to provide the measurement trigger. In some cases, the memory contains a measurement schedule usable by the processor to provide the measurement trigger according to the measurement schedule.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
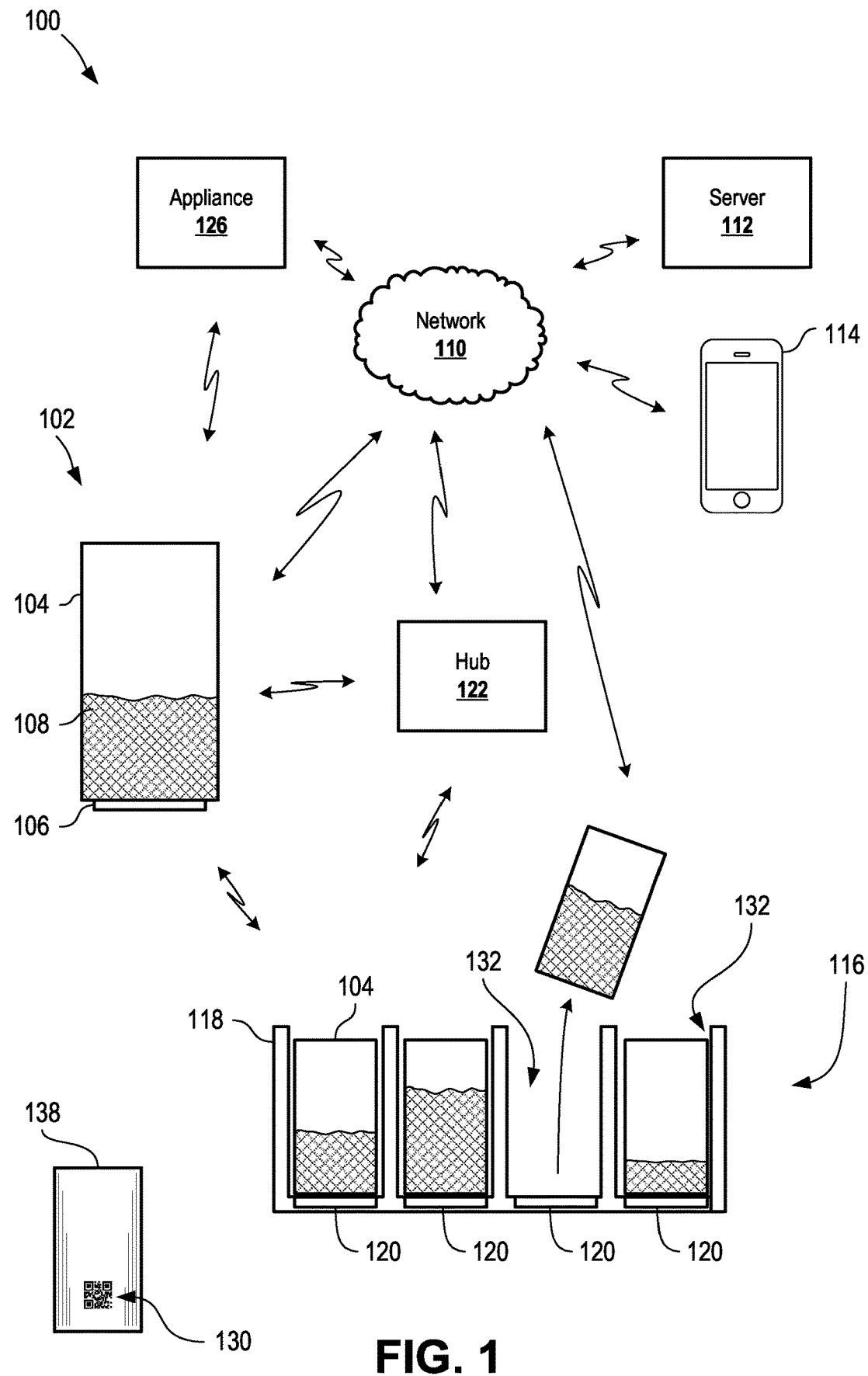
FIG. 1 is a schematic diagram of a system for monitoring the contents of a container, according to certain aspects of the present disclosure.

Certain aspects and features of the present disclosure relate to a system for dynamically measuring the contents of storage containers over time. One or more sensor tags can be used with one or more containers. Each sensor tag can be coupled to a container, incorporated or placed within a container, or associated with a receiving space for the container (e.g., a rack for holding one or more containers). Each sensor tag can include one or more sensors for determining a weight of the container. Each sensor tag can communicate with one another, a hub unit, and/or a local area network (e.g., a WiFi network) to provide information about the container to which the sensor tag is associated. By associating a type of contents with each container and/or sensor tag, the system is able to determine when a particular type of contents is running low and/or expected to be depleted, thus permitting the system to facilitate ordering replacement material to refill or replace the container.

The sensor tag can include one or more sensors for measuring the container. The sensors can be designed to measure the weight of the container, although that need not always be the case. Examples of suitable sensors include piezoelectric sensors or load cells, although other sensors can be used. In some cases, other sensors can be used to determine an amount of contents of the container. The sensor tag can include a communication interface, which can be a wireless communication interface (e.g., a Bluetooth interface, a WiFi interface, or the like). The sensor tag can connect to another sensor tag (e.g., to form a mesh network), a hub, and/or a local area network (e.g., via a WiFi router). The sensor tag can provide reporting signals associated with the container's fullness (e.g., weight of the container or other measurements) to a receiving device. The receiving device can be a server, such as a server on a local area network or the Internet. In some cases, the receiving device can be a computing device on a local area network, such as a smartphone. In some cases, the receiving device can be otherwise in wireless communication with the sensor tag (e.g., a Bluetooth connection) to receive the reporting signals. In some cases, a computing device, such as a smartphone, can access an external server (e.g., a server on the Internet) to obtain information about the sensor tag.

The system can include memory for storing historical data associated with the container's fullness. The historical data can be timestamped. This memory can be located on the sensor tag, on the receiving device (e.g., a server or smartphone), or on another device in communication with the sensor tag. The historical data can be analyzed to predict future depletion times of the container (e.g., a time at which point the container is expected to run out of its contents) and/or to determine expected consumption rates.

In some cases, the sensor tag can be battery powered, although that need not always be the case, and some sensor tags can be powered via other techniques. In some cases, a sensor tag can reduce power usage by only measuring its associated container at certain times. The sensor tag can receive a measurement trigger at these times. The measurement trigger can be received by the sensor tag based on activity from one or more sensors of the sensor tag (e.g., a movement sensor), based on an external signal (e.g., a WiFi signal), or based on an internal clock or timer (e.g., a timer or schedule for performing measurements).

In some cases, the measurement trigger can be based on movement of the container and/or sensor tag. The sensor tag can receive a signal from one or more sensors that indicate the container is moved, in which case the sensor tag can initiate a measurement immediately, after a timed delay, or after no movement has been sensed for a duration.

In some cases, the measurement trigger can be based on an external signal, such as a signal communicated through a wireless interface (e.g., WiFi). The signal can be initiated by another sensor tag, by a hub, or by a device on a network (e.g., local area network or Internet). The signal, when received by the sensor tag, can cause the sensor tag to initiate a measurement immediately or after a time delay.

In some cases, the measurement trigger can be based on a clock or timer such that measurements are made at a planned future time. For example, a clock or timer can be designed to initiate the measurement trigger at a time the container is expected to have a change in weight. This clock or timer may be set by analysis of historical data. For example, a sensor tag attached to a container of breakfast cereal may be set to check for measurements each day at 10:00 am because the historical data has shown that the weight of the container often changes during the early hours of each day (e.g., prior to 10:00 am), but does not usually change in the later hours (e.g., times after 10:00 am). In another example, a sensor tag attached to a container of rice may be set to check for measurements several times a day because the historical data has shown that the weight of the container often changes several times during the day (e.g., after lunchtime and after dinnertime).

In some cases, a sensor tag can be attached to an external surface of a container, such as the bottom of the container. A sensor tag can be attached to a container using an adhesive, although that need not always be the case. In some cases, the sensor tag can be otherwise secured to the container, such as through a mechanical connection or other technique. When attached to an external surface of the container, the sensor tag can be attached to a bottom surface of the container, such that the entire weight of the container is supported by the sensor tag. Thus, one or more sensors of the sensor tag can be used to measure the weight of the container.

In some cases, a sensor tag can be placed within the container, such as within a storage volume of the container. In such cases, the sensor tag can be used to measure the weight of some or all of the container's contents upon the sensor tag. For example, a sensor tag shaped to fit the bottom surface of an internal volume of the storage container may be suitable for measuring the weight of all of the container's contents. In another example, a sensor tag that is smaller than the bottom surface of an internal volume of the storage container may be suitable for measuring a weight of less than all of the container's contents, but at least more than 50%, 60%, 70%, 80%, and/or 90% of the container's contents. Thus, even if the sensor tag is unable to determine when the container is completely depleted of its contents, the sensor tag may be usable to predict when the container is significantly depleted or nearly depleted (e.g., containing less than 50%, 40%, 30%, 20%, 10%, 5%, 4%, 3%, 2%, and/or 1% of the container's maximum amount of contents. In some cases, the sensor tag can fit within a separate chamber to facilitate measuring the contents of the container.

In some cases, a sensor tag can be incorporated into a container during manufacture of the container. For example, a box of cereal may include a sensor incorporated into the container, such as coupled to a bottom external surface of the box or a bottom internal surface of the box, to measure the contents of the box. After the box of cereal is purchased, it can be associated with the user's system, such as by the user inputting a code or scanning an image (e.g., a barcode, such as a quick response (QR) code) containing a code associated with an identifier of the sensor tag.

Each container in a system can contain contents, which can be any consumable materials. Different containers may contain different types of contents. A type of content can be a type of material, a brand of material, or any other differentiating aspect of the consumable material. In an example, a box may contain a type of material that is cereal and a can may contain a type of material that is ground coffee. In another example, a first can may contain a type of material that is espresso ground coffee and a second can may contain a type of material that is whole coffee beans.

Each sensor tag in a system can be associated with a particular container and/or a particular type of contents. Each sensor tag can have a sensor tag identifier (ID) that can be used to associate the sensor tag with a particular container (e.g., via a container ID) and/or a particular type of contents (e.g., via a contents ID). For example, a sensor tag with a sensor tag ID of 00001 may be associated with type of contents having a contents ID of 00055. Thus, when the sensor tag with the sensor tag ID 00001 sends an update about the weight of the container to which it is associated (e.g., attached), the system can use the sensor tag ID to determine that the updated weight is associated with the type of contents having contents ID 00055.

In some cases, initially associating a sensor tag with a container and/or a type of contents can be performed using a computing device, such as a smartphone. The computing device can be used to input information about the sensor tag, container, and/or contents. In some cases, the information can be input manually, such as via typing or selecting buttons. In some cases, information can be input automatically or semi-automatically, such as via analyzing an image captured by the computing device. For example, a user may point a camera of a smartphone to the sensor tag to automatically read the sensor tag ID, then point the camera to the type of contents to have the type of contents automatically determined by image analysis. Once the type of contents is determined, it can be stored as a new contents ID or associated with an existing contents ID. In some cases, if a sensor tag is being replaced, the sensor tag ID can be used to replace a past sensor tag ID.

When associating the sensor tag with a type of contents, the user can provide density information about the contents, which can be used by the system to determine an estimated amount of the contents remaining (e.g., volume) based on measured weight. The density information can be manually entered by a user, can be determined based on a general type of contents provided by the user (e.g., when a user selects that the contents are rice or the system determines the contents are rice by image analysis, the system may access a database to determine that the density of the contents is likely around 1.452 g/ml), or can be automatically determined based on a known volume of the contents in the container (e.g., after a user fills an 8 oz container full of a material, the container's weight tare weight can be subtracted from the container's current weight when full, thus identifying the weight of 8 oz of the material, which can be used to calculate the density of the material).

In some cases, the sensor tags disclosed herein are especially suitable for disposable use. Certain aspects and features of the present disclosure can permit sensor tags to be used for long duration without needing to replace or recharge the battery. Thus, the sensor tag can be made in a small form factor and with minimal use of electronics or costly components. The small form factor can facilitate unobtrusive placement and use of the sensor tag, especially with a large variety of storage containers. In some cases, the storage containers can be the same containers in which the material is originally purchased (e.g., a box of cereal as purchased from a supplier) or user-provided containers (e.g., a generic storage container or repurposed container into which material is placed by the user).

In some cases, one or more sensor tags can be incorporated into a housing into which one or more containers can be placed. Each container used with the housing can have a designated position. For example, a housing in the form of a rack can include any number of receiving spaces, such as four receiving spaces. The housing can operate as a single sensor tag with multiple sets of sensors at each receiving space and identifiers usable to differentiate each receiving space, or the housing can include multiple sensor tags at each receiving space, optionally sharing certain modules (e.g., sharing a single power source and/or sharing a single network interface). In some cases, the act of placing a container in the receiving space can trigger measurement of that container. Each receiving space of a housing can be associated with a different container and/or type of contents. For example, a housing in the form of a spice rack may have a first receiving space for basil, a second receiving space for garlic, a third receiving space for coriander, and a fourth receiving space for ginger. In this example, as these spices are used, the system can track usage trends and/or provide a signal when it appears any of the spices are nearing depletion.

The system can be used to facilitate refilling and/or replacing a container. In some cases, a threshold amount can be set such that when the weight (or other measurement) of the container passes the threshold (e.g., drops below the threshold), an action will be triggered. The action can involve notifying a user (e.g., sending a notification to a computing device, such as a smartphone), presenting a local notification (e.g., presenting a light or sound at or near the container), generating an order for the type of contents (e.g., generating an order at an online store for delivery of replacement contents), generating an offer for ordering the type of contents (e.g., generating an email or notification with an offer usable by the user to purchase replacement contents or with a discount), or other such actions.

In some cases, the sensor tag can include and/or be communicatively coupled to a display. The sensor tag can provide information usable to present information about the type of contents on the display. For example, the sensor tag can provide weight information associated with the contents of the container, which can be presented on the display. In another example, the weight information can be used to determine an estimated amount of contents in measurement other than weight, such as a estimated number of servings remaining, an estimated number of uses remaining, an estimated volume (e.g., cups or teaspoons) remaining, or the like. In some cases, historical information can be used along with the weight information to determine the estimated amount of contents.

The system can be used to track usage of the various types of contents across the system. The system can provide a data and/or a visualization of the rate of consumption and/or historical data associated with the consumption of the types of contents. In an example, a user can check the computing device to quickly see the amounts of various ingredients in the user's kitchen. From this information, the user can determine whether or not to procure additional ingredients and/or determine what sort of meals to cook in the near future based on the ingredients that are available.

In some cases, the system can automatically recommend uses for the various types of contents in the system. For example, the system can recommend a use that requires a set of different types of contents when the system identifies that the weights and/or amounts of these different types of contents are sufficient to accommodate the use. In an example, the use can be a recipe, in which case the system can recommend the recipe because the system has detected that the necessary ingredients are in sufficient supply to complete the recipe. In some cases, other use cases (e.g., recipes) otherwise available to the system may be not displayed or otherwise marked as unavailable if they require types of contents (e.g., ingredients) that are either depleted or in insufficient supply to complete the user case (e.g., recipe).

In some cases, the system can automatically communicate with an appliance, such as an oven, microwave, or refrigerator, to facilitate using the appliance. For example, the system can communicate with an oven to identify a recipe being prepared and/or an ingredient being added, which can be used by the oven to adjust settings based on the recipe and/or the ingredient. In some cases, the weight difference between a current weight after the ingredient has been added and a previous historical weight (e.g., a presumed amount of ingredient used in the recipe) can be used to adjust settings of the appliance (e.g., a cooking temperature or cooking duration). In some cases, one or more smart tags can be associated with an appliance, such as a refrigerator. In such an example, the contents of a refrigerator can be easily tracked by monitoring the smart tags associated with the refrigerator.

In some cases, a sensor tag can be associated with and/or coupled to a freshness sensor. Any suitable freshness sensors can be used, such as a gas sensor or a sensor capable of reading a paper-based electrical gas sensor. The freshness sensor can be used to obtain freshness information about the contents of the container. In some cases, the sensor tag can report acquired freshness information and/or a computing device of the system can receive freshness information (e.g., from a sensor tag or from another source).

In some cases, a sensor tag can be provided as a kit containing one or more housings into which the sensor tag can be placed. The housing to be used can be selected based on the shape and/or type of container to which the sensor tag is desired to be associated. The sensor tag can be placed in the selected housing and then the housing can be physically associated with the container (e.g., secured to or placed within).

In some cases, a sensor tag can include or otherwise be coupled to a switch. When the switch is actuated, the sensor tag can perform one or more measurements. The switch can be positioned to actuate in response to movement of the container (e.g., when lifting the container) or in response to opening of the container (e.g., upon lifting a lid of the container).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram of a system 100 for monitoring the contents of a container, according to certain aspects of the present disclosure. The system 100 can one or more containers 104, each designed to contain contents 108. Any suitable containers 104 can be used. Each container 104 can hold different contents 108, although that need not always be the case. The system 100 can make use of sensor tags 106, 120 to measure containers 104 to determine the weight and/or amount of contents 108 remaining in the containers 104. This information can be used by other devices of the system 100 (e.g., an appliance 126, a server 112, or a computing device 114) for various purposes.

A tagged container 102 can include a container 104 having a storage volume in which its contents 108 are placed. The tagged container 102 can include a storage tag 106 coupled thereto, such as on a bottom exterior surface of the container 104. In some cases, the storage tag 106 can be located elsewhere, such as on an internal surface of the container 104.

The storage tag 106 can communicate with a network 110 (e.g., via WiFi), a hub 122 (e.g., via Bluetooth or other wireless techniques), and/or directly with any other devices of the system 100 (e.g., another sensor tag 120, an appliance 126, or a computing device 114). The storage tag 106 can occasionally measure the container 104 to determine the amount of contents 108 in the container 104. In some cases, the storage tag 106 is positioned on or in the container 104 such that the weight of the contents 108 or at least a substantial portion of the weight of the contents 108 is supported by the storage tag 106. In some cases, the weight of the container 104 is additionally supported by the storage tag 106, in which case the tare weight of the container 104 (e.g., weight of the container when empty) can be subtracted from a measured weight to determine a weight of the contents 108 of the container 104. As the container 104 is periodically emptied due to normal consumption of the contents 108, the sensor tag 106 can provide updated reports of the current weight of the container 104, weight of the contents 108, and/or determined amount of the contents 108 remaining.

In some cases, a rack 116 can be used to house multiple containers 104. The rack 116 can include a housing 118 having a number of receiving spaces 132, each capable of receiving a container 104. Each receiving space 132 can include an associated sensor tag 120, although that need not always be the case. In some cases, the entire rack 116 can operate as a single storage tag capable of reporting separate measurements associated with each of its receiving spaces 132. The rack 116 and/or each sensor tag 120 of the rack 116 can communicate similarly as storage tag 106.

When a hub 122 is used, the hub 122 can facilitate communicating reported measurements to a computing device 114, a server 112, a network 110, and/or an appliance 126.

An appliance 126 can be any suitable appliance, such as a home appliance like an oven, a refrigerator, or a microwave. Received information from the other devices of the system 100 (e.g., sensor tags 102, 120, computing device 114, or server 112) can be used to facilitate operation of the appliance 126.

A computing device 114 can be used to access information associated with the tagged container 102 and/or rack 116. The computing device 114 depicted in FIG. 1 is shown as a smartphone, although any other suitable computing device can be used (e.g., a laptop or desktop computer, a tablet, or the like). Computing device 114 can include one or more interfaces for receiving or providing information from or to a user. In some cases, the computing device 114 can be used to associate a sensor tag 106 with a container 104 and/or its contents 108. In some cases, the computing device 114 can be used to look up a weight or amount of contents 108 remaining in a particular container 104.

In some cases, the sensor tag 106, 120 can report measurements to a server 112. The server 112 can be a local server (e.g., a server on a local network) or an external server (e.g., accessible via the Internet). The server 112 can be used to store current and historical measurements, as well as facilitate calculations or analysis of data. For example, a server 112 can be used to analyze historical measurements to determine an estimated depletion time for a container 104. In some cases, the server 112 can initiate an action based on a measurement from the sensor tag 106, 120, such as transmitting a notification to the computing device 114 or facilitating refilling or replacement of the container 104 (e.g., initiating an order for replacement contents 108).

Also depicted in FIG. 1 is a refilling container 138. The refilling container 138 is a container of material that can be used to refill a container. The refilling container 138 can take any suitable shape or form, although depicted in FIG. 1 as a round can-shaped container for illustrative purposes. In some cases, when the contents 108 of a container 104 are low, the system 100 can facilitate purchasing the refilling container 138, so that the container 104 can be refilled around when or before the contents 108 are fully depleted. In some cases, refilling container 138 can include an identification marking 130. The identification marking 130 can include information about a the type of contents within the refilling container 138, such as a contents ID or other identifying information about the contents of the refilling container 138. As depicted in FIG. 1, the identification marking 130 is depicted as a QR code, although any suitable identification marking can be used. The QR code can be encoded with a contents ID and optionally additional information. In use, a computing device (e.g., smartphone) can scan the identification marking 130 to associate the contents ID of the contents of the refilling container 138 with a container 104 or a sensor tag 106. In some cases, the identification marking 130 is presented in a machine readable format that is not easily decodable to the human eye, although that need not always be the case. In some cases, the identification marking 130 can be in the form of numeric, alphanumeric, or other characters, which can be discernable by the human eye for manual input. In some cases, the identification marking 130 can be in the form of text or logos printed on or otherwise associated with the refilling container 138. For example, a refilling container that is a bag of rice may include a company logo, a photo of rice, and/or the word "rice," any of which can be used as an identification marking 130 to facilitate identifying the contents of the refilling container.

Figure 2:
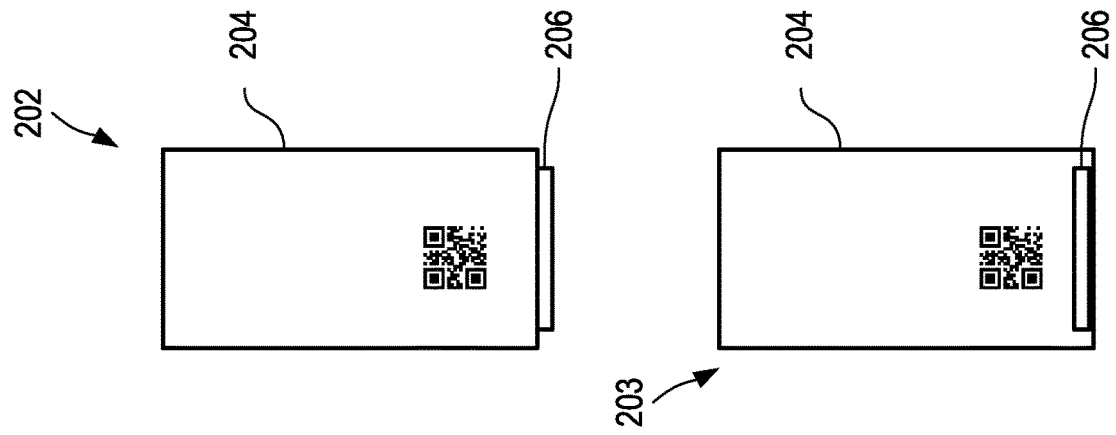
FIG. 2 is a schematic diagram depicting a sensor tag being attached to a container in two fashions, according to certain aspects of the present disclosure.
Figure 2:
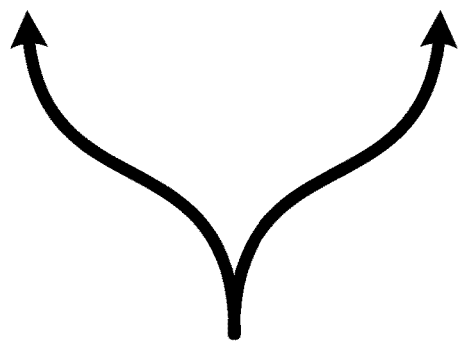
Figure 2:
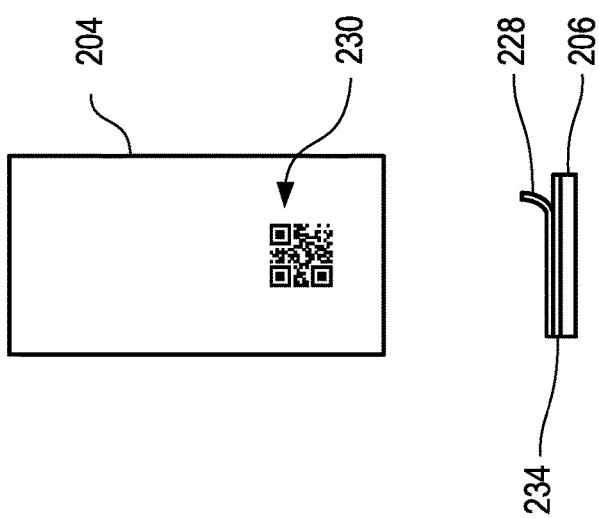

FIG. 2 is a schematic diagram depicting a sensor tag 206 being attached to a container 204 in two fashions, according to certain aspects of the present disclosure. The left portion of FIG. 2 depicts a container 204 and a sensor tag 206. The sensor tag 206 can optionally include a removable film 228 covering an adhesive layer 234. The sensor tag 206 is physically associated with the container 204 to form a tagged container, such as tagged container 102 of FIG. 1. Sensor tag 206 and container 204 can be similar to sensor tag 106 and container 104 of FIG. 1, respectively.

The top-right portion of FIG. 2 depicts a tagged container 202 in a first configuration. In the first configuration, the sensor tag 206 has been coupled to a bottom exterior surface of the container 204. In this configuration, the sensor tag 206 can measure the weight of the container 204 and any contents within. To determine the weight of the contents, the sensor tag 206 can subtract from the measured weight the tare weight of the container 204 (e.g., the weight of the container 204 when empty).

The bottom-right portion of FIG. 2 depicts a tagged container 203 in a second configuration. In the second configuration, the sensor tag 206 has been placed on or coupled to a bottom interior surface of the container 204. In this configuration, the sensor tag 206 can measure the weight of the contents of the container 204 without measuring the weight of the container 204. In this configuration, the sensor tag 206 may measure at least a portion of the weight of the contents of the container 204, such as at least 50%, 60%, 70%, 80%, 90%, and/or 95% of the weight of the contents of the container 204.

In some cases, container 204 can include an identification marking 230. The identification marking 230 can include information about a container ID of the container 204. As depicted in FIG. 2, the identification marking 230 is depicted as a QR code, although any suitable identification marking can be used. The QR code can be encoded with a container ID and optionally additional information. In use, a computing device (e.g., smartphone) can scan the identification marking 230 to associate the container ID of the container 204 with a sensor tag or with contents of the container. In some cases, the identification marking 230 is presented in a machine readable format that is not easily decodable to the human eye, although that need not always be the case. In some cases, the identification marking 230 can be in the form of numeric, alphanumeric, or other characters, which can be discernable by the human eye for manual input.

Figure 3:
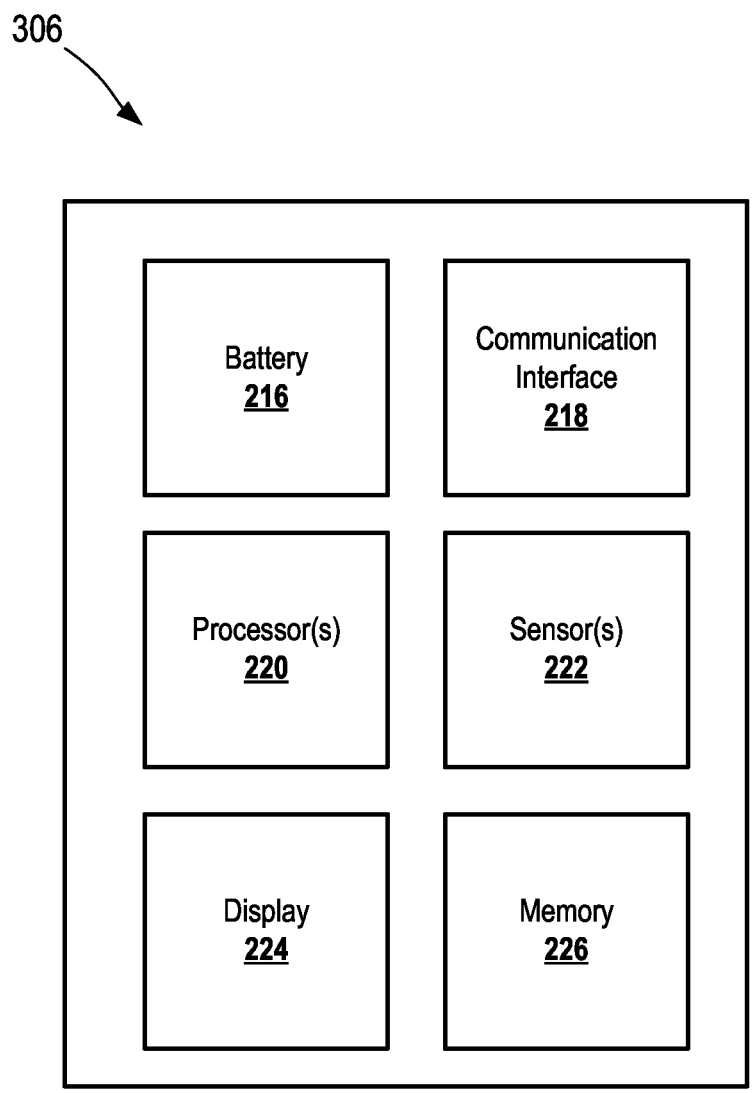
FIG. 3 is a schematic diagram depicting a sensor tag, according to certain aspects of the present disclosure.

FIG. 3 is a schematic diagram depicting a sensor tag 306, according to certain aspects of the present disclosure. Sensor tag 306 can be similar to sensor tag 106 of FIG. 1. Sensor tag 306 is depicted as containing various modules, however in some cases, sensor tag 306 can contain fewer or additional modules. Additionally, while all modules of sensor tag 306 may be contained in a single housing, that need not always be the case. In some cases, some modules of sensor tag 306 can be located in separate housings.

Sensor tag 306 can contain a battery 216. The battery 216 can be a small, single use, disposable battery. In some cases, other batteries can be used, such as rechargeable batteries. In some cases, instead of a battery 216, other power sources can be used, such as capacitors or external power sources.

Sensor tag 306 can include one or more processors 220 and memory 226. Processor(s) can perform operations stored in memory 226. Any suitable processor or memory can be used, such as those described below with reference to FIG. 8. Sensor tag 306 can include a communication interface 218. The communication interface 218 can incorporate a wireless interface, although that need not always be the case. The communication interface 218 can include a Bluetooth interface, a WiFi interface, or any other radiofrequency interface. The communication interface 218 can facilitate communications between the sensor tag 306 and another device, such as another sensor tag, a computing device (e.g., smartphone), a hub, a router, an appliance, or a server.

In some cases, sensor tag 306 can optionally include a display 224. The display 224 can be located in the housing of the sensor tag 306 or located remote from the sensor tag 306. The display 224 can be used to present information related to the contents of the container to which the sensor tag 306 is associated. For example, the display 224 can display a weight or estimated amount of the contents within the container.

Sensor tag 306 can include one or more sensors 222. The one or more sensors 222 can be any suitable sensor. The one or more sensors 222 can include a sensor used to measure the container, such as measure a weight of the container. For example, the one or more sensors 222 can include a pressure sensor, such as a load cell or piezoelectric sensor. In some cases, the one or more sensors 222 can include a sensor capable determining when the container has been moved, such as a motion sensor, acceleration sensor, optical sensor (e.g., to sense a change in lighting associated with movement of the container), or other suitable sensors. In some cases, the one or more sensors 222 can include a freshness sensor (e.g., a gas sensor) or a sensor capable of reading a freshness sensor (e.g., an optical sensor positioned to read a paper-based electrical gas sensor). In some cases, the one or more sensors 222 can include a sensor positioned to detect when the container is opened, such as a switch coupled to the container to actuate when the lid of the container is opened. Additional sensors can be used.

Figure 4:
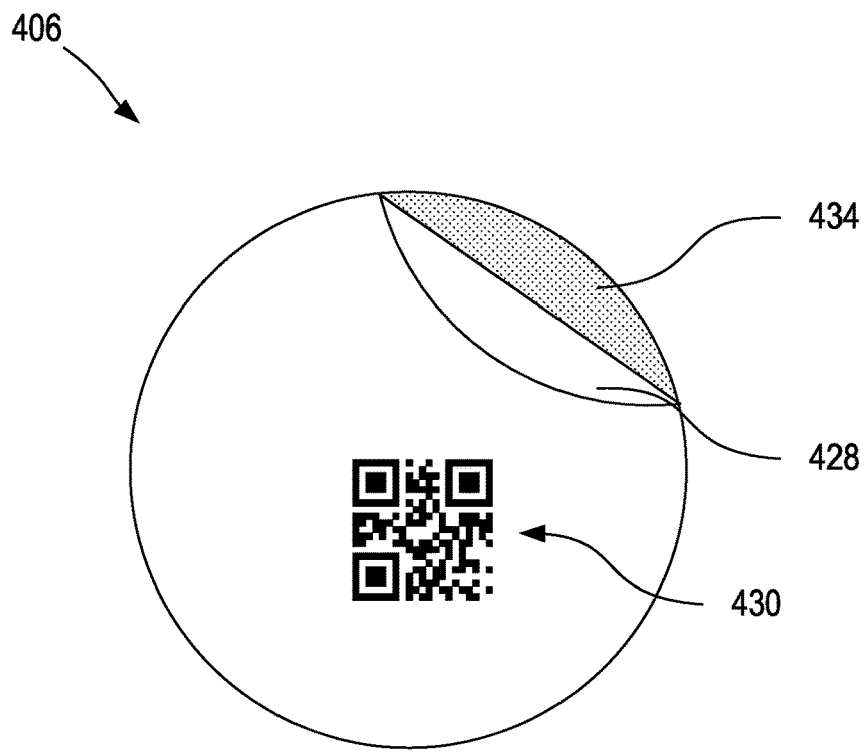
FIG. 4 is a top view of a sensor tag, according to certain aspects of the present disclosure.

FIG. 4 is a top view of a sensor tag 406, according to certain aspects of the present disclosure. Sensor tag 406 can be similar to sensor tag 106 of FIG. 1. The sensor tag 406 can include a removable film 482 that is able to be removed to expose an adhesive layer 434 thereunder. The adhesive layer 434 can be used to secure the sensor tag 406 to a container. In some cases, the removable film 428 can include an identification marking 430. The identification marking 430 can include information about the sensor tag ID of the sensor tag 406. As depicted in FIG. 4, the identification marking 430 is depicted as a QR code, although any suitable identification marking can be used. The QR code can be encoded with a sensor tag ID and optionally additional information. In use, a computing device (e.g., smartphone) can scan the identification marking 430 to associate the sensor tag ID of the sensor tag 406 with the container to which the sensor tag 406 is being coupled and/or the contents of that container. In some cases, the identification marking 430 is presented in a machine readable format that is not easily decodable to the human eye, although that need not always be the case. In some cases, the identification marking 430 can be in the form of numeric, alphanumeric, or other characters, which can be discernable by the human eye for manual input.

Figure 5:
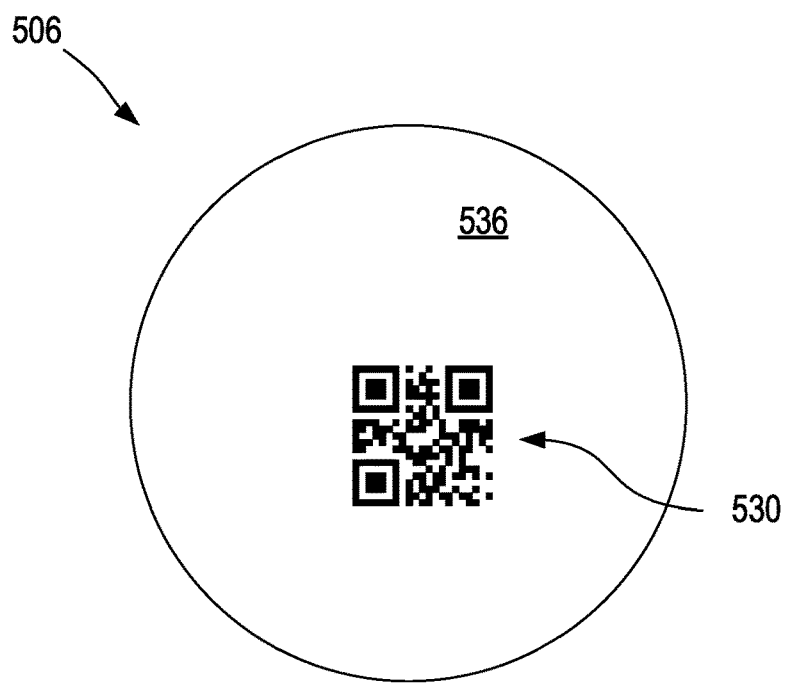
FIG. 5 is a bottom view of a sensor tag, according to certain aspects of the present disclosure.

FIG. 5 is a bottom view of a sensor tag 506, according to certain aspects of the present disclosure. Sensor tag 506 can be similar to sensor tag 106 of FIG. 1. The sensor tag 506 can include a bottom surface 536. The bottom surface 546 can be optionally coated with a non-slip material, such as a silicon-based and/or rubber-based material. In some cases, the bottom surface 536 can include an identification marking 530. Identification marking 530 can be similar to identification marking 430 of FIG. 4.

Figure 6:
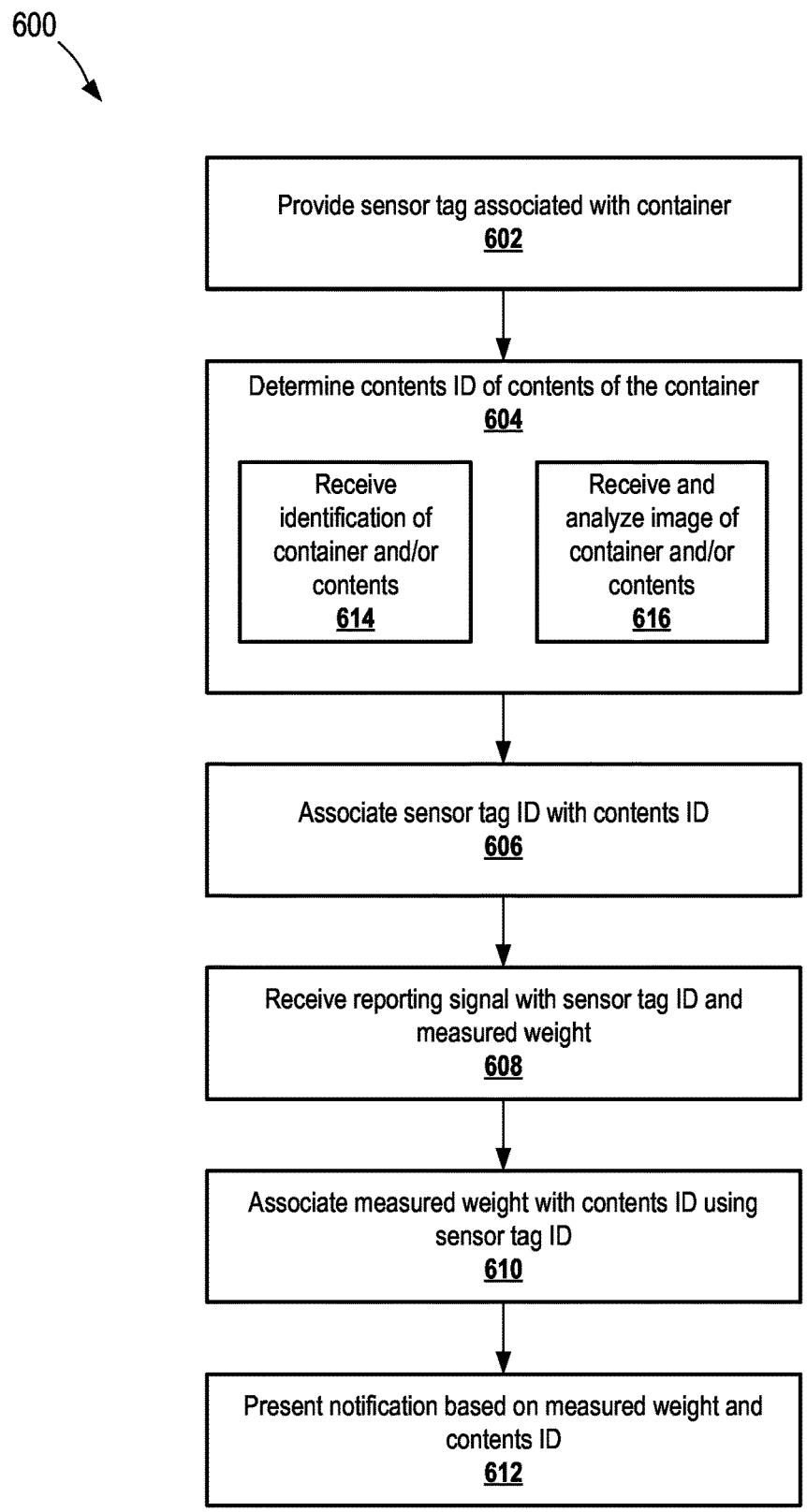
FIG. 6 is a flowchart depicting a process for using a sensor tag, according to certain aspects of the present disclosure.

FIG. 6 is a flowchart depicting a process 600 for using a sensor tag, according to certain aspects of the present disclosure. Process 600 can be performed by any suitable device of system 100 of FIG. 1, such as computing device 114 or server 112. In some cases, certain blocks of process 600 can be performed across multiple devices of system 100 of FIG. 1. For example, a server (e.g., server 112 of FIG. 1) may perform blocks 604, 606, 608, 610, whereas a computing device (e.g., computing device 114 of FIG. 1) may perform block 612. Other combinations may be used.

At block 602, a sensor tag associated with a container can be provided. Providing the sensor tag at block 602 can include providing a sensor tag and placing the sensor tag within the container (e.g., within a storage volume or within a separate space in the container). In some cases, providing the sensor tag at block 602 can include coupling the sensor tag to the container, such as on a bottom external surface of the container. In some cases, providing the sensor tag at block 602 can pressing an adhesive layer of the sensor tag against a surface of the container, such as after removing a removable film covering the adhesive layer. In some cases, providing the sensor tag at block 602 can include providing a sensor tag within a housing having a receiving space for receiving the container. In some cases, such a housing may incorporate multiple sensor tags and multiple receiving spaces for receiving multiple containers.

In some cases, providing the sensor tag at block 602 can comprise placing the sensor tag between a surface (e.g., shelf or countertop) supporting the container and the contents of the container such that all or substantially all (e.g., at least 50%, 60%, 70%, 80%, 90%, 95%, or 99%) of the weight of the contents of the container passes through the sensor tag. In such cases, the sensor tag can support the weight of the contents alone or the weight of the container including the contents. In other words, the sensor tag can receive compression force between contents of the container and a surface supporting the container.

At block 604, a contents ID is determined for the contents of the container. The contents ID can be determined through any suitable technique, such as manual entry or automatic or semi-automatic entry. In some cases, determining the contents ID comprises providing or selecting a contents ID based on the type of contents (e.g., the type of material that makes up the contents). In some cases, determining the contents ID can comprise capturing and analyzing an image of the contents to determine the type of contents.

In some cases, determining the contents ID can include receiving identification information associated with the container and/or its contents at block 614. Receiving this identification information can include receiving a container ID that is already associated with a previously used contents ID, then reusing the previously used contents ID as the current contents ID. In some cases, receiving identification information of the container and/or the contents can include receiving information indicative of the type of contents in the container.

In some cases, determining the contents ID can include receiving and analyzing an image of a container and/or its contents. In such cases, the image can be analyzed to identify any identification markings (e.g., identification markings 130, 230 of FIGS. 1 and 2, respectively) and/or other identifiable features to determine a type of contents, a contents ID, and/or a container ID. In some cases, the contents ID can be determined based on the type of contents and/or the container ID.

At block 606, the sensor tag ID can be associated with the contents ID. Associating the sensor tag ID with the contents ID can include determining the sensor tag ID and then manually or automatically associated it with the contents ID determined at block 604. Determining the sensor tag ID can include manually entering a sensor tag ID. In some cases, determining the sensor tag ID can include receiving and analyzing an image of a sensor tag, which can include an identification marking (e.g., identification marking 430 of FIG. 4) and/or other identifiable features to determine the sensor tag ID.

Associating the sensor tag ID with the contents ID at block 606 can include inputting a sensor tag ID a contents ID in a device, such as a computing device (e.g., computing device 114 of FIG. 1). For example, when registering a new sensor tag to a system, the process can involve scanning the sensor tag ID followed or preceded by selecting an existing set of contents or an existing container associated with a particular contents ID, or by scanning a new set of contents or a new container to establish a new contents ID. Then, the sensor tag ID and the contents ID can be associated together such that measurements received with the sensor tag ID will be understood as being associated with the contents ID.

At block 608, a reporting signal can be received with the sensor tag ID and a measured weight. The reporting signal received at block 608 can be transmitted by a sensor tag, such as in response to a measurement trigger. To send the reporting signal, the sensor tag can take a measurement using its one or more sensors (e.g., a weight sensor), then transmit that measurement along with the sensor tag's sensor tag ID. Upon receiving this reporting signal, the receiving device can associate the measured weight with the contents ID (e.g., with the particular set of contents or the particular container coupled to the sensor tag) using the sensor tag ID at block 610. For example, the sensor tag ID received in the reporting signal can be looked up in a database to determine an associated contents ID, then the measurements received in the reporting signal can be associated with that looked-up contents ID.

In some cases, the reporting signal can include a measurement of the weight of the container, which can later be used to determine the weight of the contents by subtracting out the tare weight of the container, which can be looked up from a database, estimated from photographic analysis, input by the user, or automatically measured by the sensor tag when the container is empty. In some cases, the sensor tag can measure the weight of the container and determine a weight of the contents by subtracting a tare weight of the container stored in the sensor tag, in which case the reporting signal can include a measurement of the weight of just the contents. In some cases, the sensor tag can measure the weight of the contents without measuring the weight of the container, in which case the reporting signal can include a measurement of the weight of just the contents.

At block 612, a notification can be presented based on the measured weight (e.g., the weight of the contents) and the contents ID. In some cases, the notification can be an alert presented on a computing device notifying a user of a weight of contents remaining. In some cases, the notification can be a portion of a display presented to a user to provide information about the levels of contents remaining across multiple containers. In some cases, the notification can be an advertisement or offer regarding the purchase of new material to refill or replace the contents of the container. In some cases, the notification can be a notice that an order will be or has been placed to purchase new material to refill or replace the contents of the container. In some cases, the notification can be a notice that some other action has been automatically taken based on the weight of the contents associated with the contents ID, such as adjusting the functioning of an appliance based on a sensed change in weight of the contents from a previous weight to the current weight. In some cases, the notification can be a recipe recommendation. In some cases, the recipe notification can be based on the weights of the contents associated with several contents IDs present in the ingredients of the recipe.

In some cases, process 600 can include blocks 602, 604, 606, 608, 610, 612 in alternate orders, as appropriate, and with more or fewer blocks.

Figure 7:
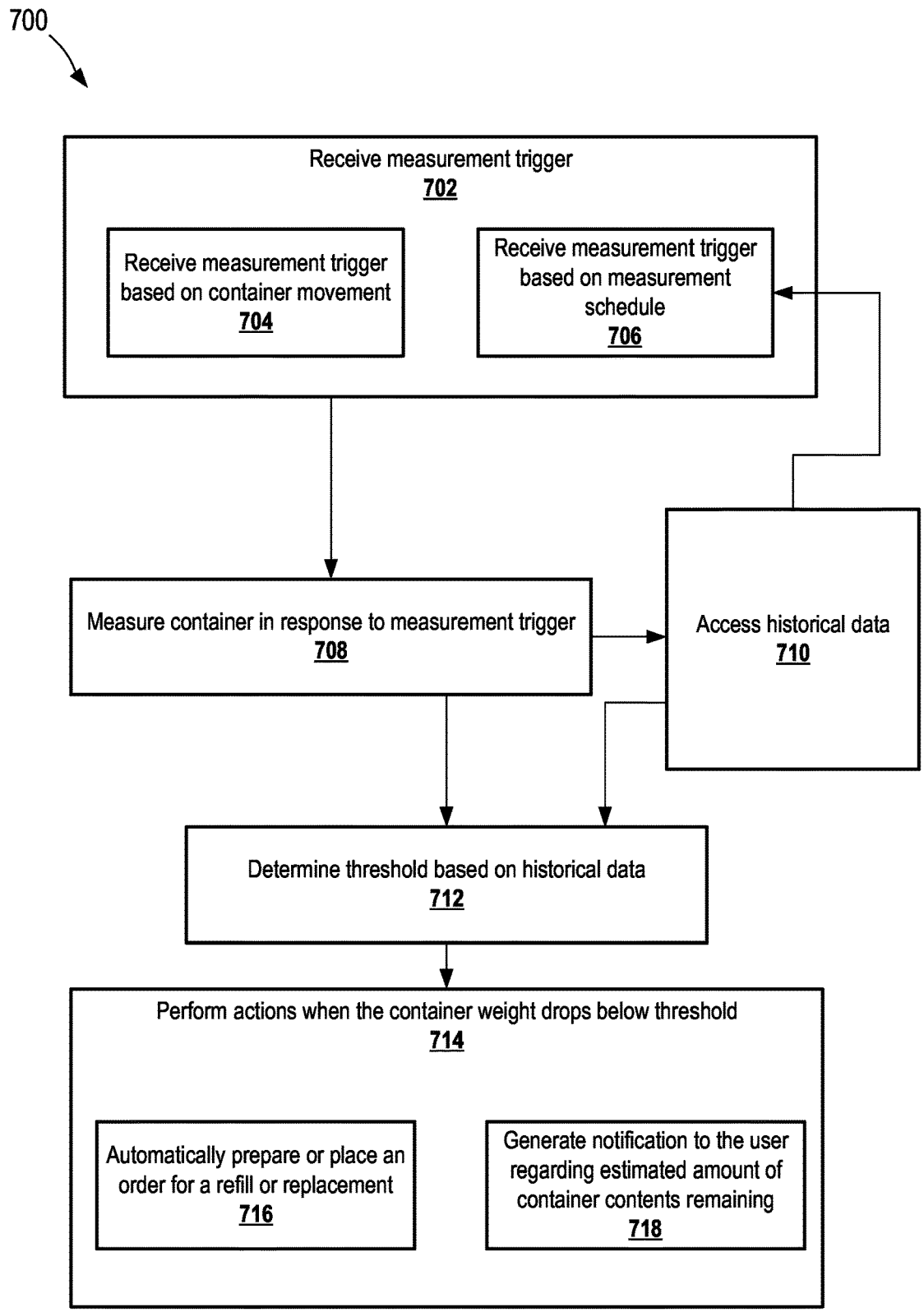
FIG. 7 is a flowchart depicting a process for triggering measurement of a sensor tag, according to certain aspects of the present disclosure.

FIG. 7 is a flowchart depicting a process 700 for triggering measurement of a sensor tag, according to certain aspects of the present disclosure. Process 700 can be performed by any suitable device of system 100 of FIG. 1, such as a sensor tag 106, 120 of FIG. 1. In some cases, certain blocks of process 700 can be performed across multiple devices of system 100 of FIG. 1. For example, a sensor tag (e.g., sensor tag 106 of FIG. 1) may perform blocks 702, 708 while a server or computing device (e.g., server 112 or computing device 114 of FIG. 1) may perform blocks 710, 712, and 714. Other combinations may be used.

At block 702, the sensor tag can receive a measurement trigger. The measurement trigger can be a software-based internal trigger (e.g., from an internal timer), a hardware-based internal trigger (e.g., from a movement sensor), or an external trigger (e.g., from a received wireless signal). The use of a measurement trigger to initiate measurements can facilitate saving battery life, which can permit the sensor tag to use batteries of small form factors, thus minimizing the overall form factor and cost of the sensor tag.

In some cases, the measurement trigger can be based on container movement at block 704. In an example, a movement sensor of the sensor tag can initiate the measurement trigger upon sensing sufficient movement indicative of movement of the container. In an example, the movement sensor can take the form of a power cutoff switch that momentarily provides power to components of the sensor tag (e.g., the processor) in response to sufficient movement indicative of movement of the container, after which circuitry of the sensor tag can permit the power to remain connected to the components of the sensor tag until after a reporting signal has been transmitted.

In some cases, the measurement trigger can be based on a measurement schedule at block 706. The measurement schedule can be any information stored in the storage tag to initiate a measurement at a future time. In some cases, a measurement schedule can define specific times for future measurements to occur (e.g., at 11:00 am). In some cases, a measurement schedule can define one or more delay periods between measurements (e.g., measure every 8 hours). In some cases, a measurement schedule can define one or more delay periods further defined by whether a change in weight has been detected (e.g., measure every hour until a change in weight is detected, then delay 12 hours and repeat). Other measurement schedules can be used. The measurement schedule can be stored on a memory of the storage tag, and can be provided and/or updated through the communications interface (e.g., via commands sent from a computing device).

Receiving the measurement trigger can cause the sensor tag to measure the container or the contents of the container at block 708. The measurement can result in a weight of the contents of the container.

At block 710, historical data associated with historical measurements can be accessed. The historical data can include past measured weights of the contents and/or container, as well as the current measurement from block 708. In some cases, historical data from block 710, and optionally current data from block 708, can be used to generate a new or updated measurement schedule, which can be stored on the sensor tag for later use in a later instance of block 706. For example, continuous detection of weight changes following a breakfast time but no weight changes present during measurements following lunchtime or dinner can be used to automatically generate an updated measurement schedule that causes the sensor tag to favor performing measurements after a breakfast time and disfavor (e.g., avoid) performing measurements after lunch or dinner times.

At block 712, a threshold can be determined based on historical data. The threshold can be a weight threshold, although other thresholds can be used and can be derived from weight (e.g., a volume threshold or a servings threshold). The threshold determined at block 712 can be determined to ensure sufficient contents remain before certain actions are taken, such as before a refill or replacement is ordered. In some cases, the threshold can be determined by accessing historical data to analyze historical consumption rates of the contents, then setting the threshold accordingly to avoid depletion of the contents based on the historical consumption rates. In some cases, the historical consumption rates can be an average consumption rate over time, such as an average weight of the contents consumed per unit of time (e.g., per hour, per day, per week, or the like). In some cases, a threshold can be set to provide a refill lag time based on the historical consumption rates. The refill lag time can be an amount of time (e.g., number of days, number of weeks, or the like) between when an action is taken (e.g., a refill order is automatically placed) and the contents are expected to be depleted. For example, if the historical consumption rates indicate that the contents are consumed at a rate of 100 g per day, and the refill lag time is three days, the threshold can be set at or around 300 g. In some cases, the threshold can include a buffer of 10%, 9%, 8%, 7%, 6%, 5%, 4%, 3%, 2%, or 1%. In the previous example, a buffer of 5% can result in a threshold set at around 315 g. In some cases, the refill lag time can be preset (e.g., via a user-provided setting) or can be based on an estimated delivery time. For example, the system can request a delivery estimate for a particular type of contents and use the delivery estimate to define the refill lag time. Thus, if a delivery estimate is 10 days, the refill lag time can be set to 10 days, thus permitting the refill materials time to arrive before the expected depletion of the contents.

Whenever the measured weight from block 708 drops below the threshold determined at block 712, actions can be performed at block 714. Any suitable actions can be performed as disclosed herein. Performing actions at block 714 can include facilitating replacing or refilling the contents of the container. For example, actions performed at block 714 can include providing a notification, such as a notification to refill the container. In some cases, performing actions at block 714 can include automatically preparing or placing an order for a refill or replacement of the contents at block 716.

In some cases, performing actions at block 714 can include generating a notification to the user regarding an estimated amount of container contents remaining. In some cases, the estimate amount of container contents remaining can be a weight, such as 100 g. In some cases, however, the estimated amount of container contents remaining can be a unit of measurement based on the weight, such as a volume or number of servings. In an example, the contents ID can be used to determine an estimated density of the contents, which can be used with the measured weight from block 708 to determine an estimated volume of contents remaining (e.g., 3 cups). In another example, the historical data from block 710 can be used to determine an estimated number of servings remaining (e.g., 3 servings remaining) or an estimated time remaining until estimated depletion of the contents (e.g., 3 days of use remaining).

In some cases, process 700 can include blocks 702, 708, 710, 712, 714 in alternate orders, as appropriate, and with more or fewer blocks.

Figure 8:
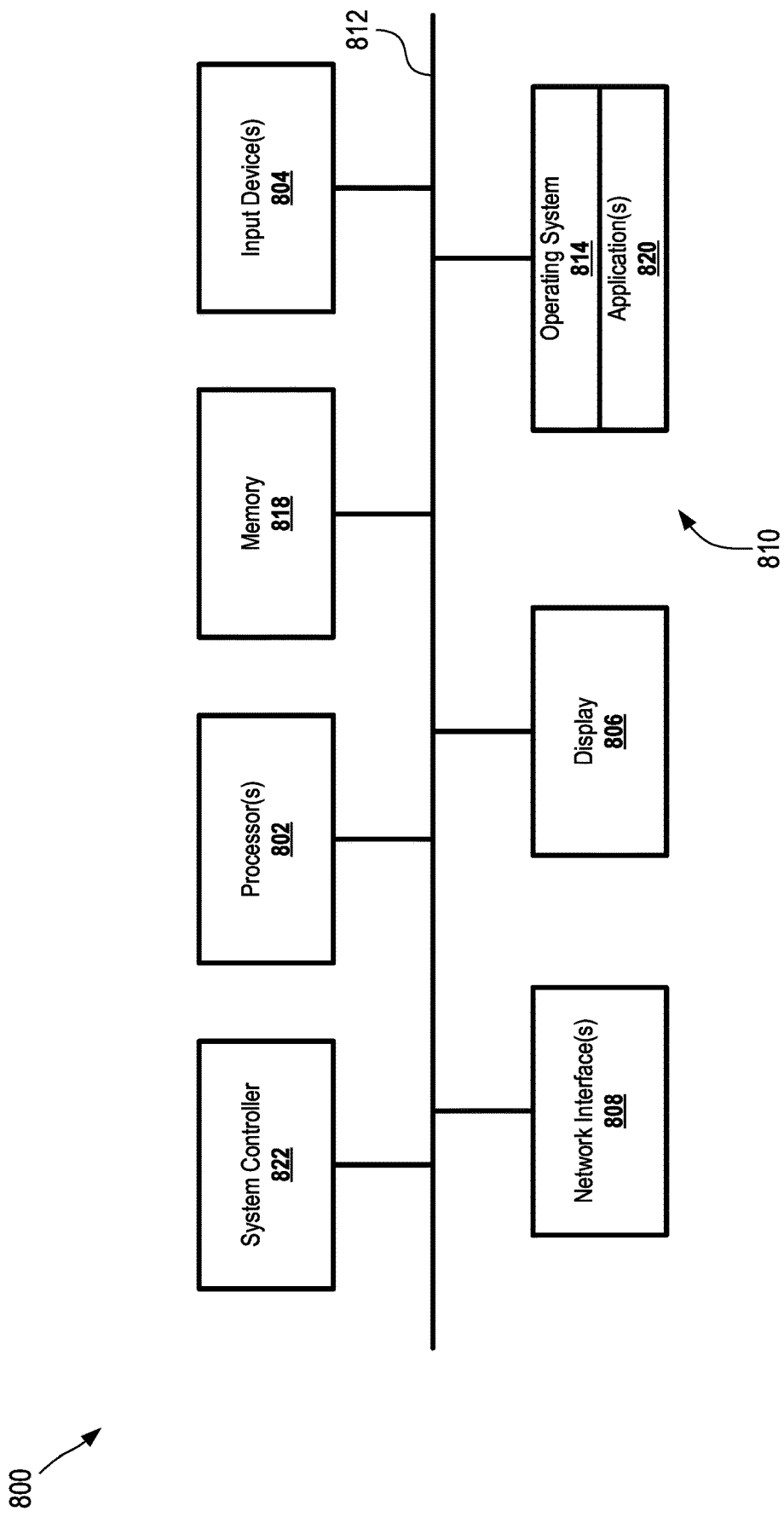
FIG. 8 is a block diagram depicting an example system architecture for implementing certain features and processes of the present disclosure.

FIG. 8 is a block diagram of an example system architecture 800 for implementing features and processes of the present disclosure, such as those presented with reference to FIGS. 1-7. The architecture 800 can be used to implement server 112, computing device 114, or any other devices of system 100 of FIG. 1. The architecture 800 can be implemented on any electronic device that runs software applications derived from compiled instructions, including without limitation personal computers, servers, smart phones, electronic tablets, game consoles, email devices, and the like. In some implementations, the architecture 800 can include one or more processors 802, one or more input devices 804, one or more display devices 806, one or more network interfaces 808, and one or more computer-readable mediums 810. Each of these components can be coupled by bus 812.

In some implementations, system architecture 800 can correspond to a single server in a rack of servers. Various rack configurations can be implemented. For example, a rack can include multiple chassis and each chassis can contain multiple servers. Each server in the rack can be connected by various hardware components (e.g., backbone, middle plane, etc.).

Display device 806 can be any known display technology, including but not limited to display devices using Liquid Crystal Display (LCD) or Light Emitting Diode (LED) technology. Processor(s) 802 can use any known processor technology, including but not limited to graphics processors and multi-core processors. Input device 804 can be any known input device technology, including but not limited to a keyboard (including a virtual keyboard), mouse, track ball, and touch-sensitive pad or display. Bus 812 can be any known internal or external bus technology, including but not limited to ISA, EISA, PCI, PCI Express, NuBus, USB, Serial ATA or FireWire.

Computer-readable medium 810 can be any medium that participates in providing instructions to processor(s) 802 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 810 can include various instructions for implementing operating system 814 and applications 820 such as computer programs. The operating system can be multi-user, multiprocessing, multitasking, multithreading, real-time and the like. The operating system 814 performs basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Computer-readable medium 810 can include various instructions for implementing firmware processes, such as a BIOS. Computer-readable medium 810 can include various instructions for implementing any of processes described herein, including at least processes 600 and 700 of FIGS. 6 and 7, respectively.

Memory 818 can include high-speed random access memory and/or non-volatile memory, such as one or more magnetic disk storage devices, one or more optical storage devices, and/or flash memory (e.g., NAND, NOR). The memory 818 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 818 can store an operating system, such as Darwin, RTXC, LINUX, UNIX, OS X, WINDOWS, or an embedded operating system such as VxWorks.

System controller 822 can be a service processor that operates independently of processor 802. In some implementations, system controller 822 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

As used below, any reference to a series of examples is to be understood as a reference to each of those examples disjunctively (e.g., "Examples 1-4" is to be understood as "Examples 1, 2, 3, or 4").

Example 1 is a method, comprising: providing a sensor tag associated with a container containing contents, wherein the sensor tag is associated with a sensor tag identifier (ID); determining a contents ID associated with the contents of the container; associating the contents ID with the sensor tag ID; receiving a reporting signal from the sensor tag, wherein the reporting signal comprises the sensor tag ID and a measured weight; associating the measured weight with a contents ID based on the sensor tag ID; and presenting a notification based on the measured weight and the contents ID.

Example 2 is the method of example(s) 1, wherein the notification is presented when the measured weight drops below a threshold weight, and wherein the notification, when presented, facilitates refilling or replacing the container with new contents of a same type as the contents.

Example 3 is the method of example(s) 2, further comprising determining a threshold weight based on the contents ID.

Example 4 is the method of example(s) 3, wherein determining the threshold weight comprises analyzing historical measured weights over time to determine the threshold weight.

Example 5 is the method of example(s) 3 or 4, wherein determining the threshold weight comprises: analyzing historical measured weights over time to determine an average weight of contents consumed per unit of time; determining a refill lag time; and calculating the threshold weight based on the average weight of contents consumed per unit of time and the refill lag time.

Example 6 is the method of example(s) 1-5, wherein the contents ID is associated with a type of the contents.

Example 7 is the method of example(s) 1-6, wherein determining the contents ID comprises: capturing an image associated with the contents; analyzing the image to determine a type of contents; and determining the contents ID based on the type of contents Example 8 is the method of example(s) 1-7, further comprising determining an amount of contents remaining based on the measured weight, wherein the amount of contents is an indication of a number of servings or a volume of contents, and wherein presenting the notification based on the measured weight comprises presenting the amount of contents remaining.

Example 9 is the method of example(s) 1-8, wherein the measured weight is a combined weight of the container and the contents, the method further comprising calculating a weight of the contents by subtracting a tare weight of the container from the combined weight.

Example 10 is the method of example(s) 9, further comprising associating a container ID with the sensor tag ID, wherein calculating the weight of the contents comprises accessing the tare weight of the container using the container ID associated with the sensor tag ID.

Example 11 is the method of example(s) 1-10, wherein the measured weight is a weight of the contents, and wherein the container is positioned within the container to measure the weight of the contents without measuring a weight of the container.

Example 12 is the method of example(s) 1-11, wherein providing the sensor tag associated with the container comprises affixing the sensor tag to the container.

Example 13 is the method of example(s) 12, further comprising: removing the sensor tag from the container; affixing a new sensor tag to the container, the new sensor tag having a new sensor tag ID; and associating the contents ID with the new sensor tag ID.

Example 14 is the method of example(s) 1-11 or 13, wherein providing the sensor tag associated with the container comprises providing a housing having a receiving space associated with the sensor tag and placing the container in the receiving space.

Example 15 is the method of example(s) 1-14, further comprising analyzing an image of the container to determine a specification of the container, wherein presenting the notification is further based on the specification of the container.

Example 16 is the method of example(s) 1-15, wherein receiving the reporting signal from the sensor tag is in response to measurement trigger being received by the sensor tag.

Example 17 is the method of example(s) 16, wherein the measurement trigger is received by the sensor tag in response to movement of the container.

Example 18 is the method of example(s) 16, further comprising: analyzing historical measured weights associated with the contents ID to determine a measurement schedule; and transmitting the measurement schedule to the sensor tag, wherein the measurement schedule, when received by the sensor tag, causes the sensor tag to receive the measurement trigger according to the measurement schedule.

Example 19 is the method of example(s) 18, wherein the measurement schedule is determined to cause the sensor tag to receive the measurement trigger at times when a change in weight of the contents is expected.

Example 20 is the method of example(s) 1-19, further comprising automatically initiating an order for additional product of the same type as the contents.

Example 21 is the method of example(s) 1-20, further comprising adjusting a function of an appliance in response to the measured weight.

Example 22 is a system comprising: one or more processors; and a memory having stored thereon machine readable instructions; wherein the one or more processors are coupled to the memory, and the method of any one of examples 1 to 21 is implemented when the machine executable instructions in the memory are executed by at least one of the one or more processors.

Example 23 is a system for measuring the contents of containers, the system including one or more processors configured to implement the method of any one of examples 1 to 21.

Example 24 is a computer program product comprising instructions which, when executed by a computer, cause the computer to carry out the method of any one of examples 1 to 21.

Example 25 is the computer program product of example 24, wherein the computer program product is a non-transitory computer readable medium.

Example 26 is a device for receiving compression force between contents of a container and a surface supporting the container, the device comprising: a housing; a processor coupled to memory and a power source; a weight sensor coupled to the processor for measuring the compression force to determine a measured weight associated with the contents of the container; a communication interface coupled to the processor for transmitting a reporting signal containing the measured weight and a sensor tag identifier (ID); and an adhesive layer coupled to the housing for affixing the housing to the container.

Example 27 is the device of example(s) 26, wherein the processor is configured to measure the measured weight and transmit the reporting signal in response to a measurement trigger.

Example 28 is the device of example(s) 27, further comprising an additional sensor coupled to the processor, wherein the additional sensor is actuatable to provide the measurement trigger.

Example 29 is the device of example(s) 27 or 28, wherein the memory contains a measurement schedule usable by the processor to provide the measurement trigger according to the measurement schedule.

What is claimed is:

1. A method, comprising:
providing a sensor tag associated with a container containing contents, the sensor tag being provided on a bottom portion of the container via an adhesive on a top layer of the sensor tag, wherein the sensor tag is associated with a sensor tag identifier (ID), the sensor tag ID being marked on a bottom layer of the sensor tag, the sensor tag configured to measure at least a partial weight associated with the contents;
determining a contents ID associated with the contents of the container by:
    capturing, with a computing device, an image associated with the contents,
    analyzing, by the computing device, the image to determine a type of contents based on identifiable features of the contents, and
    determining the contents ID based on the type of contents;
associating the contents ID with the sensor tag ID;
sending, from a computing device, a wireless signal to the sensor tag as an external trigger to initiate a measurement;
receiving, at the computing device, a reporting signal from the sensor tag, wherein the reporting signal comprises the sensor tag ID and a measured weight;
associating, by the computing device, the measured weight with the contents ID based on the sensor tag ID;
determining, by the computing device, an estimated density of the content based on the contents ID;
calculating, by the computing device, a volume of the contents based on the determined estimated density and the measured weight;
communicating, by the computing device, with an appliance to determine a recipe being prepared, the appliance including an oven, a microwave, or both, the recipe being determined based on a detection of ingredients being in sufficient supply and/or ingredients being added;
sending, by the computing device, a signal to the appliance that causes an adjustment to cooking duration and temperature settings of the appliance based on the determined recipe, the measured weight, the volume, and the contents ID; and presenting a notification on the computing device based on the adjustment to the cooking duration and temperature settings, the measured weight, the volume, and the contents ID.

2. The method of claim 1, wherein the notification is presented when the measured weight drops below a threshold weight, and wherein the notification, when presented, facilitates refilling or replacing the container with new contents of a same type as the contents.

3. The method of claim 2, further comprising determining a threshold weight based on the contents ID.

4. The method of claim 3, wherein determining the threshold weight comprises analyzing historical measured weights over time to determine the threshold weight.

5. The method of claim 4, wherein determining the threshold weight comprises:
   analyzing historical measured weights over time to determine an average weight of contents consumed per unit of time;
   determining a refill lag time; and
   calculating the threshold weight based on the average weight of contents consumed per unit of time and the refill lag time.

6. The method of claim 1, wherein the contents ID is associated with a type of the contents.

7. The method of claim 1, further comprising determining an amount of contents remaining based on the measured weight, wherein the amount of contents is an indication of a number of servings or the volume of contents, and wherein presenting the notification based on the measured weight comprises presenting the amount of contents remaining.

8. The method of claim 1, wherein the measured weight is a combined weight of the container and the contents, the method further comprising calculating a weight of the contents by subtracting a tare weight of the container from the combined weight.

9. The method of claim 8, further comprising associating a container ID with the sensor tag ID, wherein calculating the weight of the contents comprises accessing the tare weight of the container using the container ID associated with the sensor tag ID.

10. The method of claim 1, wherein the measured weight is a weight of the contents, and wherein the sensor tag is positioned within the container to measure the weight of the contents without measuring a weight of the container.

11. The method of claim 1, further comprising:
    removing the sensor tag from the container;
    affixing a new sensor tag to the container, the new sensor tag having a new sensor tag ID; and
    associating the contents ID with the new sensor tag ID.

12. The method of claim 1, wherein providing the sensor tag associated with the container comprises providing a housing having a receiving space associated with the sensor tag and placing the container in the receiving space.

13. The method of claim 1, further comprising analyzing an image of the container to determine a specification of the container, wherein presenting the notification is further based on the specification of the container.

14. The method of claim 1, wherein receiving the reporting signal from the sensor tag is in further response to a measurement trigger being received by the sensor tag, wherein the measurement trigger is received by the sensor tag in response to movement of the container.

15. The method of claim 1, further comprising:
    analyzing historical measured weights associated with the contents ID to determine a measurement schedule; and
    transmitting the measurement schedule to the sensor tag, wherein the measurement schedule, when received by the sensor tag, causes the sensor tag to receive the external trigger according to the measurement schedule.

16. The method of claim 15, wherein the measurement schedule is determined to cause the sensor tag to receive the measurement trigger at times when a change in weight of the contents is expected.

17. The method of claim 1, further comprising automatically initiating an order for additional product of the same type as the contents.

18. The method of claim 14, wherein the sensor tag is temporarily turned on by sensing of the movement of the container and turned off after transmitting the reporting signal.

19. The method of claim 1, wherein the notification includes a cooking temperature for the oven, a cooking duration for the oven, or both.

20. The method of claim 1, wherein the container is one of a plurality of containers in a spice rack, and wherein the notification includes usage trends of content in each of the plurality of containers in the spice rack.

* * * * *